H. H. PHILLIPS.
AUTOMATIC BRAKE.
APPLICATION FILED APR. 8, 1913.

1,085,476.

Patented Jan. 27, 1914.
2 SHEETS—SHEET 1.

Witnesses

Inventor
Harry H. Phillips
By Victor J. Evans
Attorney

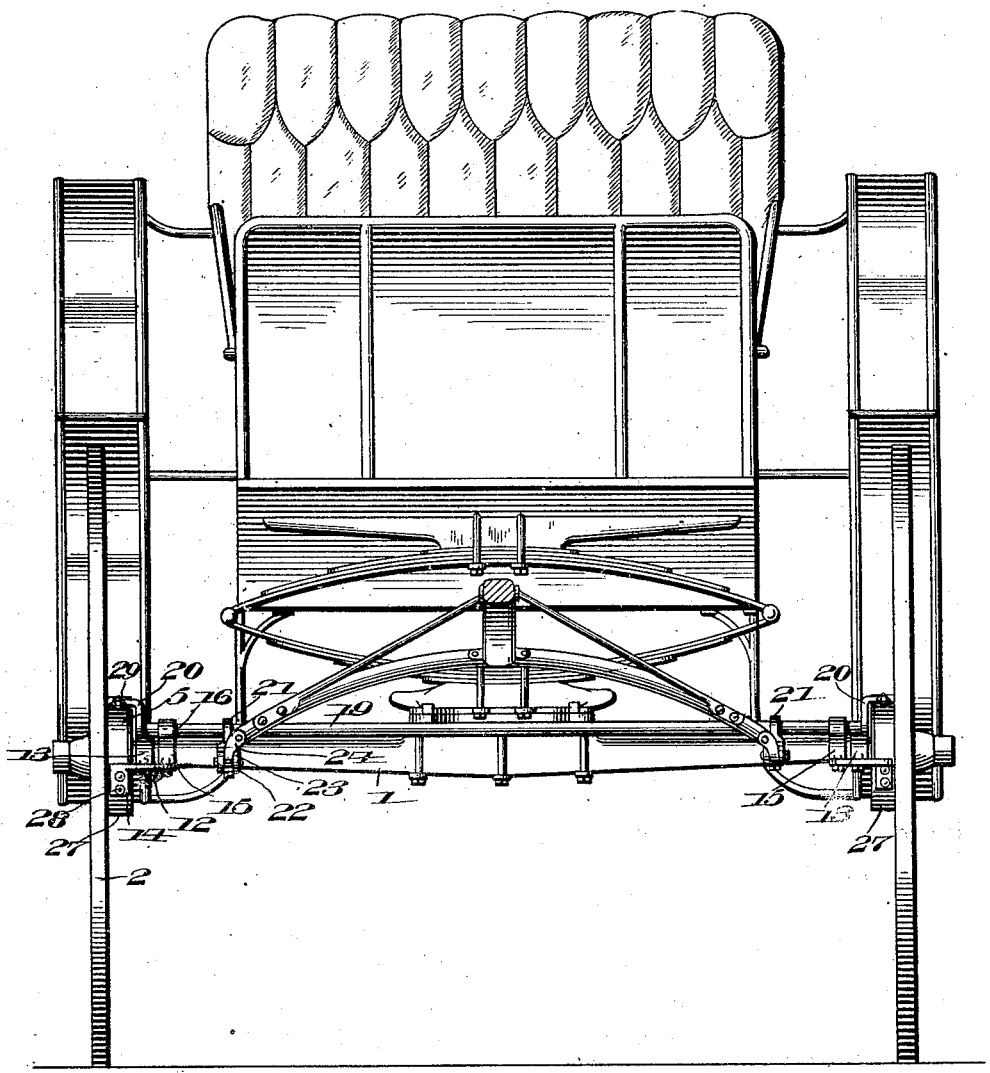

UNITED STATES PATENT OFFICE.

HARRY H. PHILLIPS, OF CHEWELAH, WASHINGTON, ASSIGNOR OF ONE-HALF TO HUGH S. SPEDDEN, OF CHEWELAH, WASHINGTON.

AUTOMATIC BRAKE.

1,085,476.  Specification of Letters Patent.   Patented Jan. 27, 1914.

Application filed April 8, 1913. Serial No. 759,718.

*To all whom it may concern:*

Be it known that I, HARRY H. PHILLIPS, a citizen of the United States, residing at Chewelah, in the county of Stevens and State of Washington, have invented new and useful Improvements in Automatic Brakes, of which the following is a specification.

This invention is an improved automatic brake for carriages, wagons and other vehicles, the object of the invention being to provide an improved brake of this character which is very compact, is strong and durable, is simple in construction and which operates automatically.

The invention consists in the construction, combination and arrangement of devices hereinafter described and claimed.

Figure 1:
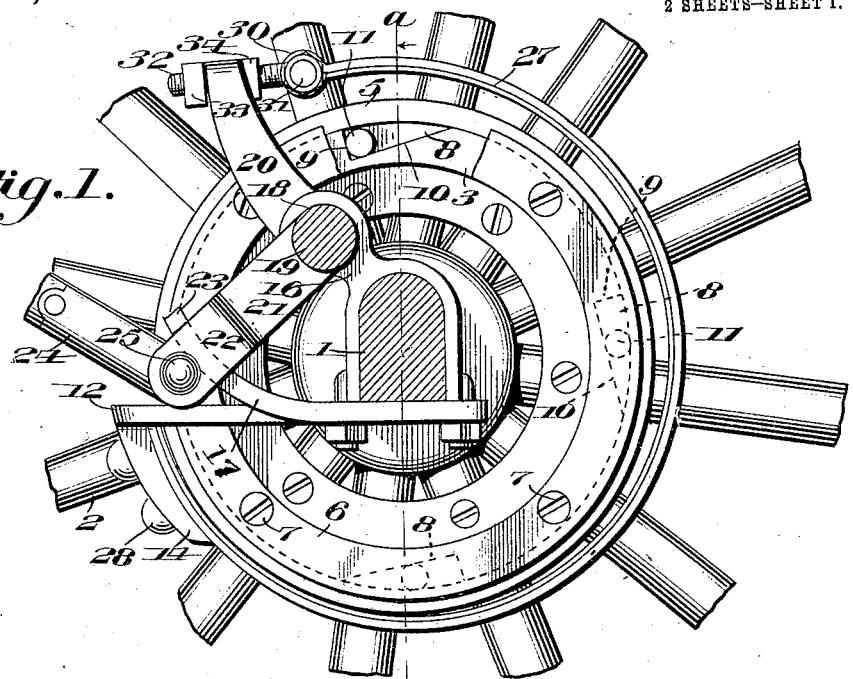
Figure 2:
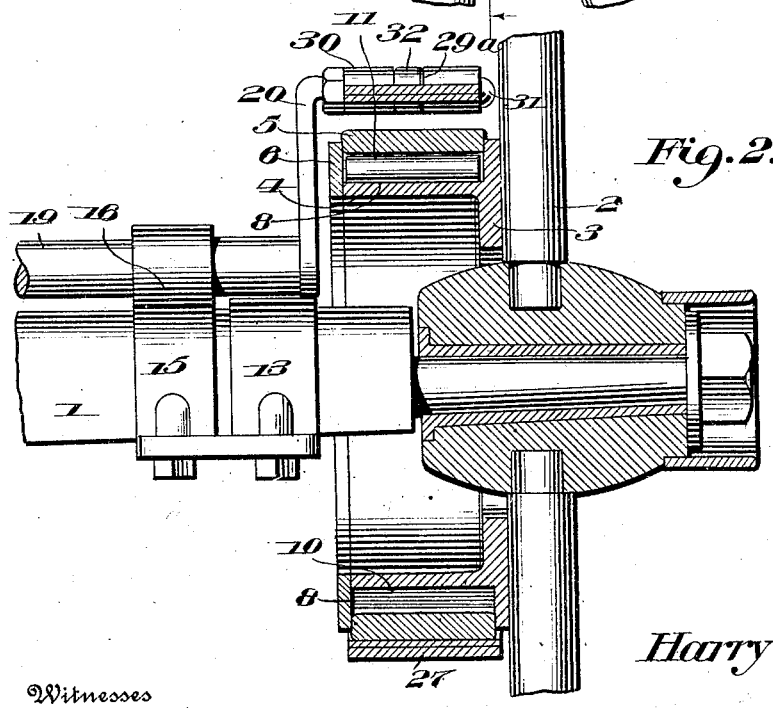

In the accompanying drawings:—Figure 1 is an elevation of an automatic brake apparatus constructed in accordance with my invention, showing the same in connection with the front axle and the wheel of a carriage, the axle being indicated in cross section. Fig. 2 is a sectional view of the same on the plane indicated by the line $a$—$a$ of Fig. 1. Fig. 3 is a front elevation of the same.

For the purposes of this specification, the front axle of a vehicle is indicated at 1 and one of the wheels at 2. On the inner side of the wheel is a brake wheel 3 secured thereto, concentrically therewith, the brake wheel being provided with an inwardly exte lin brake flange 4 the periphery of wh h channeled.

A friction ring 5 is arranged loosely in the channel of the brake wheel and bears on the periphery thereof and is kept in place by an annular plate 6 which is secured to the inner edge of the flange 4 and partially overlaps the said friction ring, the annular plate being secured by means of screws 7.

The brake wheel is provided at suitable points with peripheral recesses 8 each of which is formed with a shoulder 9 that is radial to the brake wheel and a bottom 10 which is tangential thereto so that the bottoms of the said recesses form inclined planes. In each recess is a friction roller 11 adapted when in the deepened end of the recess to be out of contact with the friction ring and also adapted when the brake wheel moves independently of and angularly with respect to the friction ring to be moved outwardly by the cam action of the bottoms of the recesses 8 into engagement with the friction ring, so as to lock the latter to the friction wheel, as will be understood.

Near each end of the axle is a forwardly extending arm 12 the said arms being secured to the axle by means of clips 13 and each having a downwardly extending curved arm 14 at its front end. Clips 15 are also secured on the axle and each is provided with a forwardly extending upwardly inclined arm 16 and also with a forwardly and upwardly curved draft bar 17 which is concentric with a central bearing opening 18 in the arm 16.

A brake shaft 19 which extends across the carriage in front and above the front axle and nearly from wheel to wheel is mounted in the bearing openings 18, is provided at its ends with upwardly and outwardly extending curved arms 20 and is also provided, near its ends, with downwardly and forwardly extending draft arms 21 which are at substantially right angles to the arms 20. The said draft arms 21 have their lower front ends bifurcated to form forks 22 through which the draft bars extend, the draft bars having T-heads 23 at their front ends which extend across the draft arms and, hence, serve to limit the forward movement thereof.

The draft irons 24 of the thills or tongue are coupled in the forks 22 by means of bolts 25 such as are usually employed and it will be understood that, hence, the draft of the tongues or thill is exerted first on the draft arms and when the vehicle is under draft tension the draft arms are in the initial position shown in Fig. 1 and bear against the T-heads 23 of the draft bars.

A brake belt spring 27 is provided for each brake wheel, is bolted at one end to the arm 14 as at 28 and its free upper end, is bifurcated as at 29, provided with eyes 30 and connected by a bolt 31 which extends through said eyes to an eye bolt 32, the shank of which extends through an opening in one of the arms 20 and is adjustably secured thereto by means of nuts 33—34.

Normally the spring brake belt is out of contact with the periphery of the friction ring 5 and the latter is free to revolve with the brake wheel which revolves with one of the front vehicle wheels. When the horse or team is backed or the vehicle in descending a hill begins to move faster than the horse or team, the back pressure of the thills or tongue on the draft arms 21 causes the latter to move downwardly, thereby partly turning the brake shaft 19 and causing the arms 20 of the said brake shaft to move therewith and, hence, draw the spring brake belts against and in contact with the periphery of the friction rings 5, thus checking the rotation of the friction rings and as the brake wheels continue to turn with the vehicle wheels, the inclined bottoms of their recesses 8 move the friction rollers 11 outwardly, engage said friction rollers with the friction rings and thus lock the friction rings to the brake wheels thus applying the brakes to the front vehicle wheels and, hence, checking the motion of the vehicle.

When the carriage is backed, the rollers 11 roll into the recesses 8, thus releasing the friction ring from the brake wheel and allowing the wheels to revolve rearwardly, freely.

While I have herein shown and described a preferred form of the invention, I would have it understood that changes may be made in the form, proportion and construction of the several parts without departing from the spirit of the invention and within the scope of the appended claims.

I claim:—

1. In vehicle brake apparatus in combination with spring brake belts, an axle, clips on the axle provided with bearings and also provided with curved draft bars concentric with said bearings, a rock shaft mounted in said bearings and provided with upwardly extending arms and also with draft arms the latter serving for the attachment of thills or a tongue and the said draft arms being so related to the said draft bars as to cause the latter to limit the extent of forward movement of said draft arms, the said spring brake belts being connected to and operated by the upwardly extending arms of the rock shaft.

2. In vehicle brake apparatus in combination with spring brake belts, an axle, clips on the axle provided with bearings and also provided with curved draft bars concentric with said bearings, a rock shaft mounted in said bearings and provided with upwardly extending arms and also with draft arms the latter serving for the attachment of thills or a tongue and the said draft arms being so related to the said draft bars as to cause the latter to limit the extent of forward movement of said draft arms and adjusting bolts carried by the upturned arms of the rock shaft and to which the spring brake belts are connected.

In testimony whereof I affix my signature in presence of two witnesses.

HARRY H. PHILLIPS.

Witnesses:
 LULU C. HOWE,
 J. W. PATTERSON.